(12) United States Patent
Park et al.

(10) Patent No.: US 9,407,107 B2
(45) Date of Patent: Aug. 2, 2016

(54) APPARATUS AND METHOD FOR CONTROLLING CHARGING POWER OF WIRELESS POWER RECEIVER

(71) Applicant: Samsung Electronics Co., Ltd., Gyeonggi-do (KR)

(72) Inventors: Sung-Kweon Park, Gyeonggi-do (KR); Young-Min Lee, Gyeonggi-do (KR); Kil-Soo Ko, Gyeonggi-do (KR); Ki-Hyun Kim, Gyeonggi-do (KR); Se-Ho Park, Gyeonggi-do (KR); Jin-Hyoung Park, Gangwon-do (KR)

(73) Assignee: Samsung Electronics Co., Ltd (KR)

( * ) Notice: Subject to any disclaimer, the term of this patent is extended or adjusted under 35 U.S.C. 154(b) by 483 days.

(21) Appl. No.: 13/680,811

(22) Filed: Nov. 19, 2012

(65) Prior Publication Data
US 2013/0127410 A1    May 23, 2013

(30) Foreign Application Priority Data

Nov. 18, 2011  (KR) .................. 10-2011-0120828

(51) Int. Cl.
*H02J 7/00* (2006.01)
*H02J 1/14* (2006.01)
*H02J 5/00* (2016.01)
*H02J 7/02* (2016.01)

(52) U.S. Cl.
CPC . *H02J 7/007* (2013.01); *H02J 1/14* (2013.01); *H02J 5/005* (2013.01); *H02J 7/0052* (2013.01); *H02J 7/025* (2013.01); *H02J 7/0077* (2013.01)

(58) Field of Classification Search
CPC ........ H02J 7/025; H01F 38/14; Y02T 90/122; B60L 11/182; Y02E 60/12
USPC .......................................... 320/108
See application file for complete search history.

(56) References Cited

U.S. PATENT DOCUMENTS

| 2006/0113955 | A1* | 6/2006 | Nunally | ................. | H02J 7/025 320/108 |
|---|---|---|---|---|---|
| 2008/0303479 | A1* | 12/2008 | Park | ..................... | H02J 7/025 320/108 |
| 2009/0096413 | A1* | 4/2009 | Partovi et al. | ................. | 320/108 |
| 2010/0201310 | A1* | 8/2010 | Vorenkamp et al. | ......... | 320/108 |
| 2011/0025263 | A1* | 2/2011 | Gilbert | ................. | H02J 7/0044 320/108 |
| 2011/0115430 | A1* | 5/2011 | Saunamaki | ............ | H02J 5/005 320/108 |
| 2011/0127951 | A1* | 6/2011 | Walley | ................... | H02J 5/005 320/108 |
| 2011/0241618 | A1* | 10/2011 | Karalis | ................ | B60L 11/182 320/108 |
| 2012/0112691 | A1* | 5/2012 | Kurs | .................... | B60L 11/182 320/108 |

* cited by examiner

*Primary Examiner* — Arun Williams
(74) *Attorney, Agent, or Firm* — The Farrell Law Firm, P.C.

(57) ABSTRACT

In an apparatus for adjusting charging power of a wireless power receiver, when one or more wireless power receivers require charging, it is determined whether the sum of required charging powers required by the one or more wireless power receivers exceeds maximum supplied power provided by a wireless power transmitter. When a result indicates that the sum exceeds the maximum supplied power, a control operation is performed to adjust the required charging power of each wireless power receiver. Therefore, it is possible to wirelessly charge each wireless power receiver without interruption.

30 Claims, 6 Drawing Sheets

APPARATUS AND METHOD FOR CONTROLLING CHARGING POWER OF WIRELESS POWER RECEIVER

PRIORITY

This application claims priority under 35 U.S.C. 119(a) to Korean Patent Application Serial No. 10-2011-0120828, which was filed in the Korean Intellectual Property Office on Nov. 18, 2011, the contents of which are incorporated herein by reference.

BACKGROUND OF THE INVENTION

1. Field of the Invention

The present invention relates generally to an apparatus for controlling charging power, and more particularly, to an apparatus and a method for controlling a total required power of one or more wireless power receivers during a charging of a relevant wireless power receiver.

2. Description of the Related Art

Wireless power transmission technology has recently been utilized for many electronic devices, such as electric toothbrushes, electric shavers, mobile phones, and digital cameras. Studies are also being conducted on improved wireless charging of large batteries, e.g., for electric cars and subway trains.

Wireless power transmission technologies are largely divided into a magnetic field inductive coupling scheme, an electric field capacitive coupling scheme, and a Radio Frequency (RF) radiation scheme. Among them, the inductive coupling scheme is currently the most efficient and frequently used scheme.

The inductive coupling scheme is based on the same principle of an electric transformer. In a wireless power transmission system, a primary coil and a secondary coil of an electric transformer are used in such a manner that the primary coil is separated from the secondary coil and is then installed in a wireless power transmitter unit, whereas the secondary coil is installed in a wireless power receiver unit of an electronic device.

Among inductive coupling schemes, a scheme for causing a resonance frequency of a primary coil and a secondary coil to match an operating frequency of a power source and increasing the transmission distance of wireless power transmission by increasing a Q factor of each of the primary coil and the secondary coil is defined as a resonance coupling scheme. Herein, the primary coil is referred to as a "TX resonator," and the secondary coil is referred to as an "RX resonator," and many studies are currently being conducted on the resonance coupling scheme.

In the wireless power transmission system, data communication is performed between a TX resonator and an RX resonator in order to efficiently transmit power. For example, authentication information between the wireless power transmitter unit and the wireless power receiver unit, information on the voltage and current of received power, and information on an abnormal state of the wireless power receiver unit, are transmitted. In relation to a band for communication, there are an in-band communication scheme using a carrier frequency band of wireless power and an out-band communication scheme (for example, 2.4 GHz Zigbee® communication) using another separate band.

As described above, there is a limit on the magnitude of wireless power that the conventional wireless power transmitter unit can supply. For example, there are various classes of the magnitude of wireless power that the conventional wireless power transmitter unit can supply, such as 5-watt, 10-watt and 20-watt classes. The wireless power transmitter unit supplies wireless power while it freely varies the magnitude of power within this limit on wireless power.

However, there are diverse types of the magnitude of power that the wireless power receiver unit requires according to devices, each including the wireless power receiver unit. Even in the case of mobile phones, there are various types of the magnitude of power, such as 2.5 watt, 3 watt and 4 watt. Tablet Personal Computers (PCs) or laptop computers require more power than mobile phones, while some devices require less power than mobile phones.

When one or more devices intend to simultaneously receive power from one wireless power transmitter unit, it is common that the magnitude of total power that one or more devices require exceeds a limit on a transmitter output of the wireless power transmitter unit. Accordingly, there is a problem in that the wireless power transmission can be interrupted.

As such, there is an inconvenience in that some wireless power receiver units can receive wireless power, whereas other wireless power receiver units may not receive wireless power.

SUMMARY OF THE INVENTION

Accordingly, an aspect of the present invention is to solve the above-mentioned problems, and to provide an apparatus and a method for controlling required power when a sum of total required power of one or more wireless power receivers exceeds power that a wireless power transmitter can maximally output, when the one or more wireless power receivers simultaneously request the supplying of power.

In accordance with an aspect of the present invention, a transmission apparatus for adjusting charging power of a wireless power receiver includes a power supply unit for outputting a power signal, a signal modulator for modulating the power signal, and generating a data signal, and a transmission controller for calculating a sum of required charging powers of one or more wireless power receivers when a data signal for wireless charging is received from the one or more wireless power receivers, and generating a charging power adjustment signal for adjusting the required charging power of each of the one or more wireless power receivers through the signal modulator and transmitting the generated charging power adjustment signal to each of the one or more wireless power receivers, when the calculated sum exceeds maximum supplied power capable of being supplied by the transmission apparatus.

In accordance with another aspect of the present invention, a reception apparatus for adjusting charging power includes a battery unit for storing a power signal, a charging control circuit unit for receiving the power signal, and delivering the received power signal to the battery unit, a load modulator for modulating the power signal, and generating a data signal, and a reception controller for generating a packet data signal for wireless charging through the load modulator, and transmitting the generated data signal to a wireless power transmitter, and controlling the charging control circuit unit to adjust required charging power of the reception apparatus when a charging power adjustment signal for adjusting the required charging power of the reception apparatus is received from the wireless power transmitter.

BRIEF DESCRIPTION OF THE DRAWINGS

The above and other features, aspects, and advantages of the present invention will be more apparent from the following detailed description taken in conjunction with the accompanying drawings, in which.

DETAILED DESCRIPTION OF EMBODIMENTS OF THE PRESENT INVENTION

Hereinafter, embodiments of the present invention will be described in detail with reference to the accompanying drawings. In the following description and the accompanying drawings, a detailed description of publicly-known functions and configurations which may unnecessarily obscure the subject matter of the present invention, will be omitted.

Figure 1:
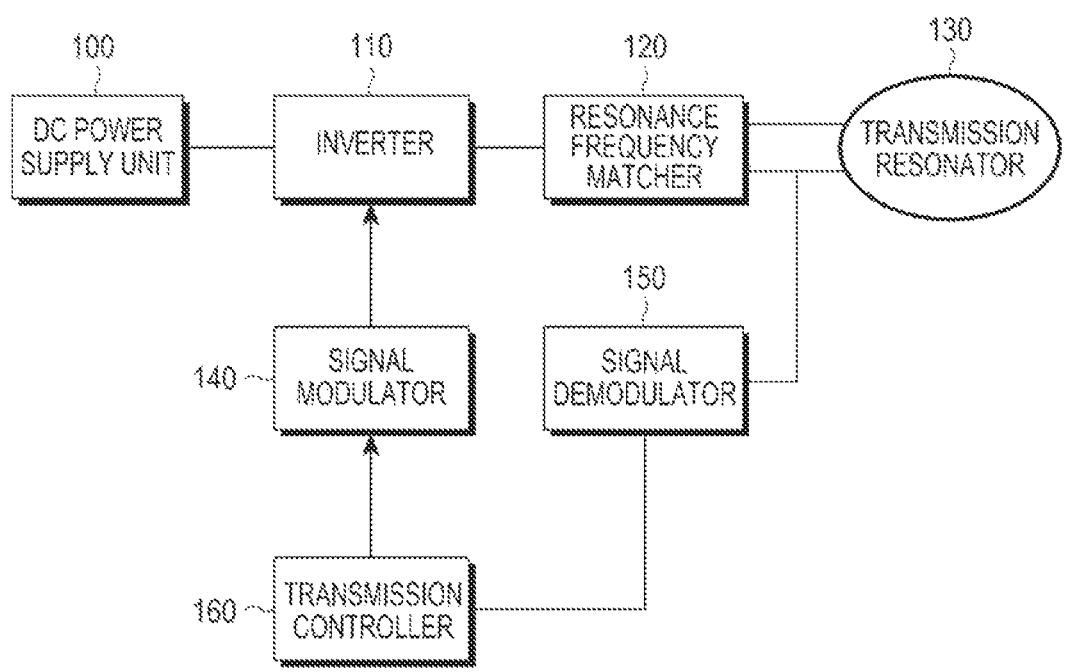
FIG. 1 illustrates a configuration of a wireless power transmitter according to an embodiment of the present invention.

FIG. 1 illustrates a configuration of a wireless power transmitter according to an embodiment of the present invention.

The wireless power transmitter includes a DC (Direct Current) power supply unit 100, an inverter 110, a resonance frequency matcher 120, a transmission resonator 130, a signal modulator 140, a signal demodulator 150, and a transmission controller 160.

The DC power supply unit 100 outputs a DC power signal for charging a power source of a wireless power receiver.

The inverter 110 converts a DC power signal to an AC (Alternating Current) power signal.

The resonance frequency matcher 120 performs matching of a resonance frequency of an AC power signal by using L (coil) and C (condenser) (not shown).

The transmission resonator 130 first generates a magnetic field for Near Field Communication (NFC) and then transmits power signals or control signals generated by the wireless power transmitter to one or more wireless power receivers, and receives signals generated by the one or more wireless power receivers from the receivers.

According to the control of the transmission controller 160, the signal modulator 140 modulates a power signal, and generates a control signal for control.

The signal demodulator 150 demodulates the signal received from the wireless power receiver, and delivers a demodulated signal to the transmission controller 160.

The transmission controller 160 controls the signal modulator 140 to generate a ping signal for NFC, and controls the transmission resonator 130 to output the generated ping signal.

When a packet data signal including identification information and characteristic information of each of the one or more wireless power receivers is received from the one or more wireless power receivers that received the ping signal, the transmission controller 160 first identifies the identification information and the characteristic information included in the received packet data signal, and then authenticates the one or more wireless power receivers. Herein, the identification information of the wireless power receiver includes ID (IDentification) information of the wireless power receiver, and the characteristic information includes maximum required power of each of the wireless power receivers.

When the packet data signal for wireless charging is received from the one or more wireless power receivers, the transmission controller 160 calculates the sum of maximum required charging powers of the one or more wireless power receivers. When the calculated sum exceeds a wireless power which may be supplied by the wireless power transmitter, the transmission controller 160 controls the signal modulator to generate a charging power adjustment signal for adjusting required charging power of each of the wireless power receivers.

Specifically, the transmission controller 160 calculates the sum of maximum charging powers in a constant current mode for the one or more wireless power receivers, and determines whether the calculated sum of maximum charging power exceeds maximum supplied power that the wireless power transmitter may output. When a result of the determination indicates that the calculated sum of maximum charging power does not exceed the maximum supplied power that the wireless power transmitter may output, the transmission controller 160 performs a control operation for transmitting wireless power to the one or more wireless power receivers.

When the result of the determination indicates that the calculated sum of maximum charging power exceeds the maximum supplied power that the wireless power transmitter may output, the transmission controller 160 controls the signal modulator 140 to generate a first charging power adjustment signal for reducing maximum charging power of each wireless power receiver to previously-set first threshold power, and performs a control operation for transmitting the generated first charging power adjustment signal to each wireless power receiver. For example, the previously-set first threshold power may be the amount of power which exceeds the maximum supplied power of the wireless power transmitter.

When the wireless power transmitter receives a charging termination signal from at least one wireless power receiver while it transmits the adjusted wireless power, the transmission controller 160 controls the signal modulator 140 to generate a second charging power adjustment signal for increasing adjusted maximum charging power of each of the other wireless power receivers, except for the at least one wireless power receiver to previously-set second threshold power.

Thereafter, the transmission controller 160 transmits the generated second charging power adjustment signal to each of the other wireless power receivers. The previously-set second threshold power may be the amount of wireless power transmitted to the wireless power receiver, of which charging has been completed.

In other words, in accordance with an embodiment of the present invention, when charging of the wireless power receiver has been completed, extra power transmitted to the wireless power receiver which has undergone completed charging, is first distributed and is then transmitted to the other wireless power receivers. Accordingly, the other wireless power receivers are more rapidly charged.

When charging of the one or more wireless power receivers has been completed, the transmission controller 160 performs a control operation for transmitting a charging completion signal for completing the transmission of wireless power to each wireless power receiver. When a response signal to the charging completion signal is received from each wireless power receiver, the transmission controller 160 performs a control operation for completing the transmission of wireless power.

As described above, when the sum of powers that the one or more wireless power receivers intend to receive exceeds the maximum supplied power that the wireless power transmitter itself may supply, the wireless power transmitter may adjust the power that the one or more wireless power receivers intend to receive, and thereby, may wirelessly charge each wireless power receiver without interruption.

Figure 2:
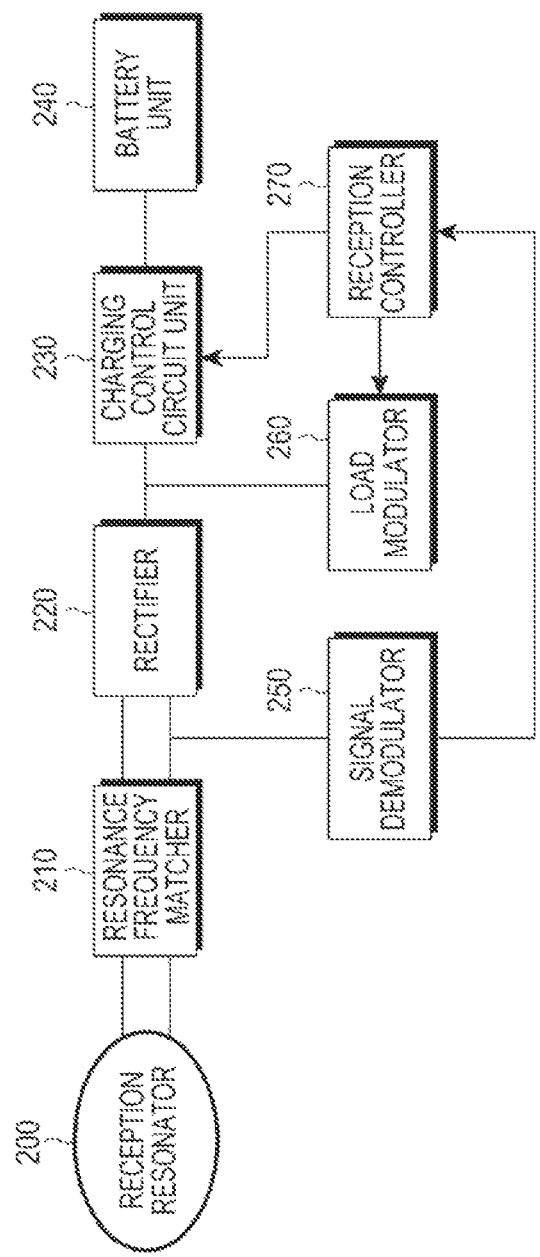
FIG. 2 illustrates a configuration of a wireless power receiver according to an embodiment of the present invention.

FIG. 2 illustrates a configuration of a wireless power receiver according to an embodiment of the present invention.

The wireless power receiver includes a reception resonator 200, a resonance frequency matcher 210, a rectifier 220, a charging control circuit unit 230, a battery unit 240, a signal demodulator 250, a load modulator 260, and a reception controller 270.

The reception resonator 200 is inductively coupled to the transmission resonator 130 of the wireless power transmitter, and receives wireless power from the wireless power transmitter.

The resonance frequency matcher 210 performs matching of a resonance frequency of an AC power signal by using L (coil) and C (condenser) (not shown).

The rectifier 220 converts the received AC power signal to a DC power signal.

The charging control circuit unit 230 adjusts the amount of charging power which is charged to the battery unit 240 according to the control of the reception controller 270.

The signal demodulator 250 demodulates control signals received from the wireless power transmitter, and delivers demodulated control signals to the reception controller 270.

The load modulator 260 modulates a power signal, and generates a data signal including data according to the control of the reception controller 270.

When a ping signal is received from the wireless power transmitter, the reception controller 270 causes the wireless power receiver to switch from a standby mode state to an operation mode state, controls the load modulator 260 to generate a data signal including identification information and characteristic information of the wireless power receiver, and controls the reception resonator 200 to transmit the generated data signal to the wireless power transmitter.

When a first charging power adjustment signal for reducing charging power to previously-set first threshold power is received from the wireless power transmitter, the reception controller 270 performs a control operation for reducing present charging power to the previously-set first threshold power, before it performs a control operation for generating a first response signal to the received first charging power adjustment signal and transmitting the generated first response signal to the wireless power transmitter.

Accordingly, when wireless power adjusted by being reduced is received from the wireless power transmitter, the reception controller 270 controls the charging control circuit unit 230 so that the battery unit 240 stores the received wireless power therein.

Thereafter, when charging of the battery unit 240 is completed, the reception controller 270 performs a control operation for transmitting a charging termination signal reporting the completion of charging to the wireless power transmitter.

When a second charging power adjustment signal for increasing adjusted charging power to previously-set second threshold power is received from the wireless power transmitter, the reception controller 270 controls the charging control circuit unit 230 to increase charging power of the wireless power receiver to the second threshold power, and performs a control operation for generating a response signal to the second charging power adjustment signal and transmitting the generated response signal to the wireless power transmitter.

Accordingly, when wireless power adjusted by being increased is received from the wireless power transmitter, the reception controller 270 controls the charging control circuit unit 230 such that the battery unit 240 stores the received wireless power.

As described above, when the sum of powers that the one or more wireless power receivers intend to receive exceeds the maximum supplied power that the wireless power transmitter may supply, the power that the one or more wireless power receivers intend to receive may be adjusted, and uninterrupted wireless charging of each wireless power receiver is provided.

Figure 3:
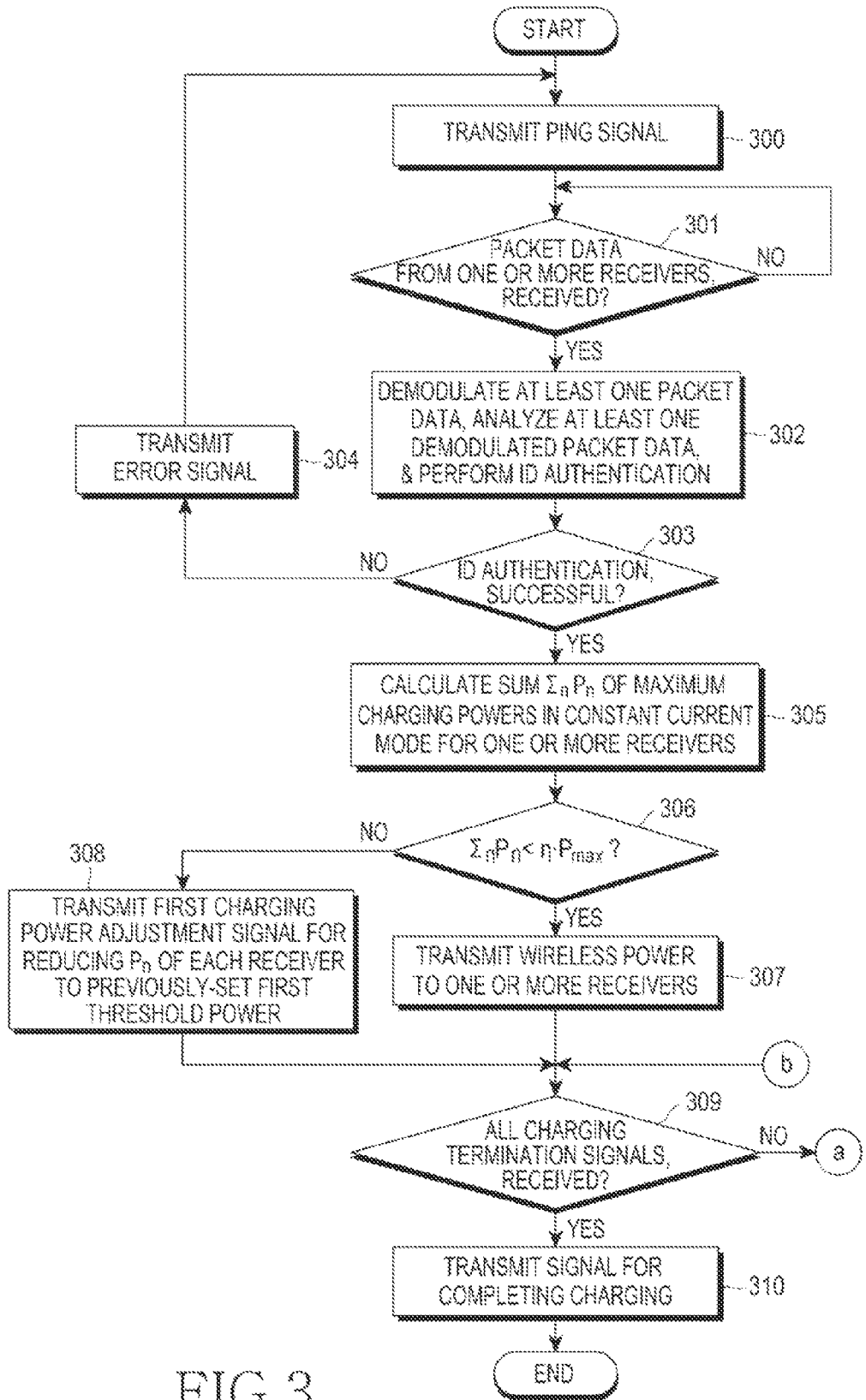
FIG. 3 illustrates a process for controlling charging power by a wireless power transmitter according to an embodiment of the present invention.

FIG. 3 illustrates a process for controlling charging power by a wireless power transmitter according to an embodiment of the present invention.

Referring to FIG. 3, in step 300, the transmission controller 160 transmits a ping signal to a wireless power receiver in a network.

In step 301, the transmission controller 160 determines whether a packet data signal including identification information and characteristic information of each of one or more wireless power receivers is received from the one or more wireless power receivers. When the packet data signal is received, the transmission controller 160 proceeds to step 302, whereas when the packet data signal is not received, the transmission controller 160 continuously determines whether the packet data signal is received.

In step 302, the transmission controller 160 demodulates at least one packet data by using the identification information of each wireless power receiver, before it analyzes at least one demodulated packet data, and performs ID authentication.

In step 303, the transmission controller 160 determines whether the ID authentication of the one or more wireless power receivers is successful. When the ID authentication of the one or more wireless power receivers is successful, the transmission controller 160 proceeds to step 305. When the ID authentication of the one or more wireless power receivers is not successful, the transmission controller 160 transmits an error signal, namely, an error message, reporting an authentication failure, in step 304.

In step 305, the transmission controller 160 calculates the sum of maximum charging powers in a constant current mode for the one or more wireless power receivers. In other words, the transmission controller 160 calculates a sum $\Sigma_n P_n$ of maximum charging powers in a constant current mode for an n number of wireless power receivers.

In step 306, the transmission controller 160 determines whether the sum $\Sigma_n P_n$ of maximum charging powers in the constant current mode for the one or more wireless power receivers is less than maximum power $n \cdot P_{max}$ that the wireless power transmitter may supply. When the sum $\Sigma_n P_n$ is less than the maximum power $n \cdot P_{max}$, the transmission controller 160 proceeds to step 307. When the sum $\Sigma_n P_n$ is equal to or greater than the maximum power $n \cdot P_{max}$, the transmission controller 160 proceeds to step 308.

In step 307, the transmission controller 160 transmits wireless power to the one or more wireless power receivers.

In step 308, the transmission controller 160 transmits a first charging power adjustment signal for reducing maximum charging power $P_n$ in a constant current mode for each wireless power receiver to previously-set first threshold power, to each wireless power receiver.

In step 309, the transmission controller 160 determines whether charging termination signals are all received from the one or more wireless power receivers. When the charging termination signals are all received from the one or more wireless power receivers, the transmission controller 160 transmits a charging completion signal for completing the charging to each wireless power receiver in step 310. When a response signal to the charging completion signal is received, the transmission controller 160 completes the operation of charging wireless power.

Figure 4:
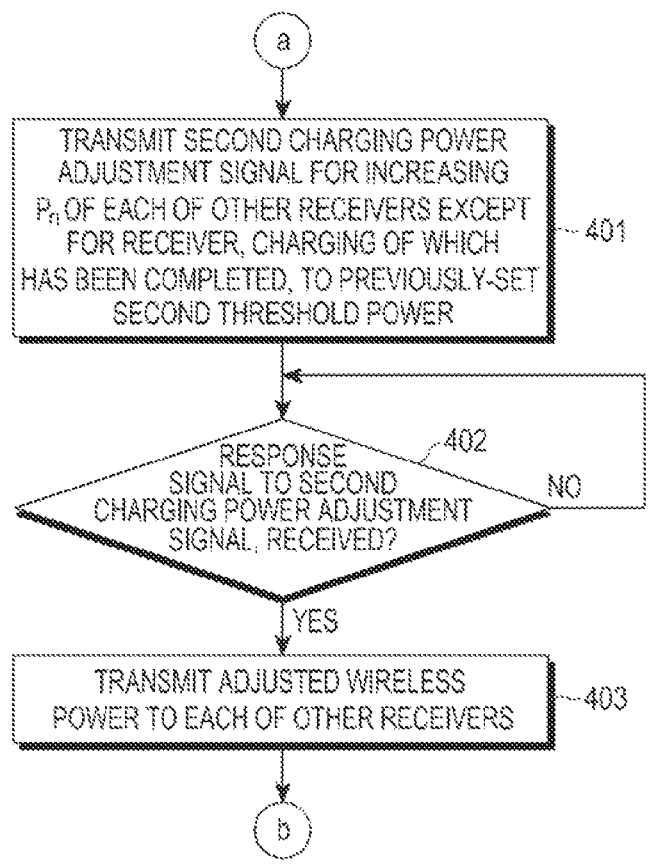
FIG. 4 illustrates a process for readjusting adjusted wireless power when charging of at least one wireless power receiver is completed, according to an embodiment of the present invention.

In step 309, when the charging termination signals are not all received from the one or more wireless power receivers, step 401 in FIG. 4 is performed.

FIG. 4 illustrates a process for readjusting adjusted wireless power when charging of at least one wireless power receiver is completed, according to an embodiment of the present invention.

When the charging termination signals are not all received from the one or more wireless power receivers, in step 401, the transmission controller 160 generates a second charging power adjustment signal for increasing maximum charging power $P_n$ in a constant current mode for each of the other wireless power receivers except for a wireless power receiver of which charging has been completed, to previously-set second threshold power. Then, the transmission controller 160 transmits the generated second charging power adjustment signal to each of the other wireless power receivers.

In step 402, the transmission controller 160 determines whether a response signal to the second charging power adjustment signal is received from at least one wireless power receiver. When the response signal to the second charging power adjustment signal is received from the at least one wireless power receiver, the transmission controller 160 proceeds to step 403. When the response signal to the second charging power adjustment signal is not received from the at least one wireless power receiver, the transmission controller 160 continuously determines in step 402 whether the response signal to the second charging power adjustment signal is received.

In step 403, the transmission controller 160 transmits adjusted wireless power to each of the other wireless power receivers except for a wireless power receiver of which charging has been completed. Then, the transmission controller 160 performs step 309 in FIG. 3.

As described above, when the sum of powers that the one or more wireless power receivers intend to receive exceeds maximum supplied power that the wireless power transmitter may supply, the power that the one or more wireless power receivers intend to receive may be adjusted, and uninterrupted wireless charging of each wireless power receiver is provided.

Figure 5:
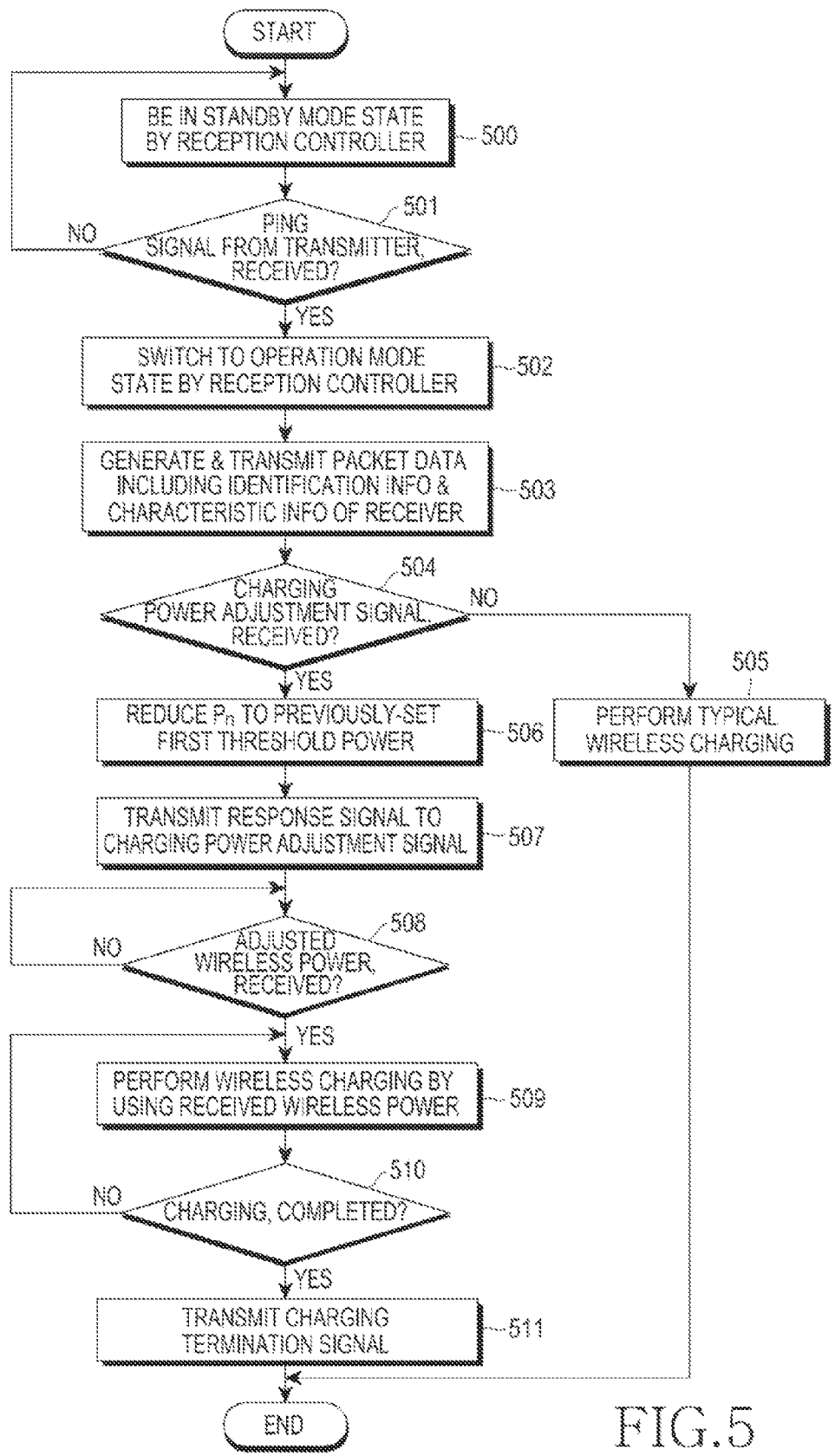
FIG. 5 illustrates a process for controlling charging power by a wireless power receiver according to an embodiment of the present invention.

FIG. 5 illustrates a process for controlling charging power by a wireless power receiver according to an embodiment of the present invention.

Referring to FIG. 5, in step 500, the reception controller 270 is in a standby mode state. The reception controller 270 determines whether a ping signal is received from the wireless power transmitter in step 501. When the ping signal is received from the wireless power transmitter, the reception controller 270 proceeds to step 502. When the ping signal is not received from the wireless power transmitter, the reception controller 270 remains in the standby mode state, in step 500.

In step 502, the reception controller 270 switches from the standby mode state to an operation mode state according to the ping signal.

In step 503, the reception controller 270 controls the load modulator 260 to generate a packet data signal including identification information and characteristic information of the wireless power receiver, and controls the reception resonator 200 to transmit the generated packet data signal to the wireless power transmitter.

In step 504, the reception controller 270 determines whether a first charging power adjustment signal for reducing maximum charging power $P_n$ to previously-set first threshold power is received from the wireless power transmitter. When the first charging power adjustment signal is received from the wireless power transmitter, the reception controller 270 proceeds to step 506. When the first charging power adjustment signal is not received from the wireless power transmitter, the reception controller 270 performs normal wireless charging in step 505. Then, the reception controller 270 completes the process of wireless charging.

In step 506, the reception controller 270 reduces the maximum charging power to the previously-set first threshold power.

In step 507, the reception controller 270 generates a first response signal to the received first charging power adjustment signal, and transmits the generated first response signal to the wireless power transmitter.

When wireless power adjusted by being reduced is received from the wireless power transmitter, the received wireless power is stored in the battery unit 240 through the charging control circuit unit 230.

In step 508, the reception controller 270 determines whether adjusted wireless power is received. When the adjusted wireless power is received, the reception controller 270 proceeds to step 509. When the adjusted wireless power is not received, the reception controller 270 continuously determines in step 508 whether the adjusted wireless power is received.

In step 509, the charging control circuit unit 230 performs wireless charging by charging the adjusted wireless power to the battery unit 240.

In step 510, the reception controller 270 determines whether charging is completed. When the charging is completed, the reception controller 270 proceeds to step 511. When the charging is not completed, the reception controller 270 continuously performs wireless charging in step 509.

In step 511, the reception controller 270 transmits a charging termination signal reporting the completion of charging to the wireless power transmitter, and completes the charging when a charging completion signal is received from the wireless power transmitter.

Figure 6:
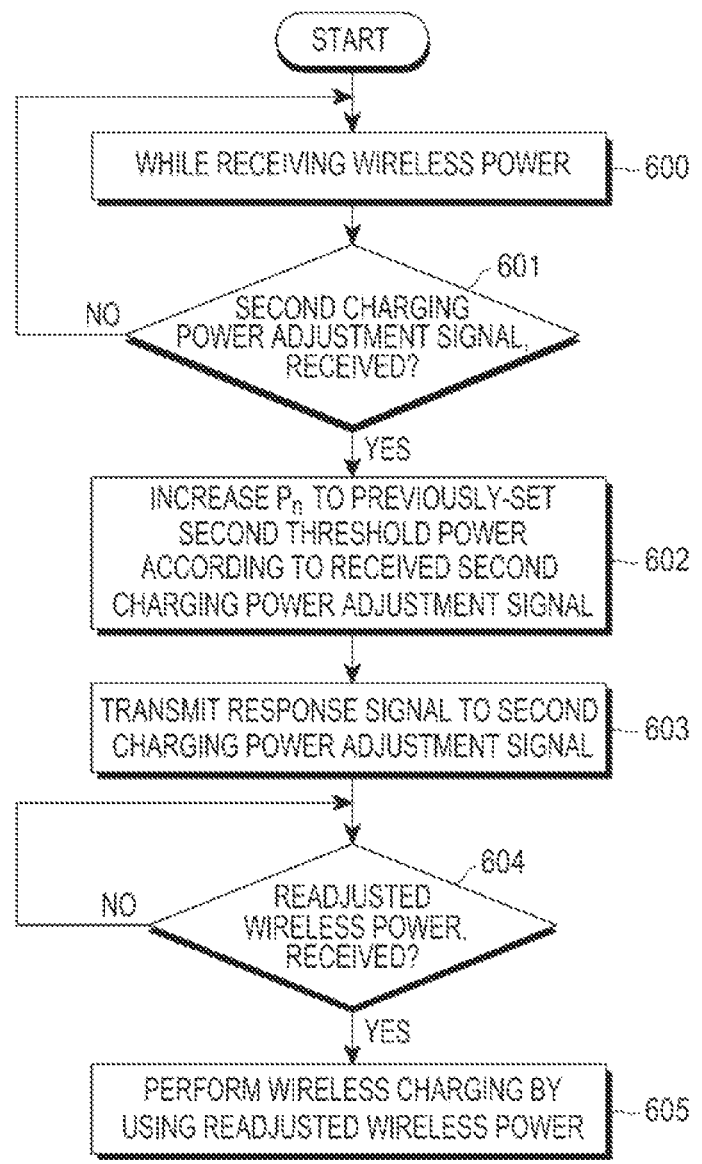
FIG. 6 illustrates a process for readjusting adjusted wireless power of a wireless power receiver according to an embodiment of the present invention.

FIG. 6 illustrates a process for readjusting adjusted wireless power of a wireless power receiver according to an embodiment of the present invention.

While adjusted wireless power is received in step 600, the reception controller 270 determines in step 601 whether a second charging power adjustment signal for increasing adjusted maximum charging power to previously-set second threshold power is received from the wireless power transmitter. When the second charging power adjustment signal is received from the wireless power transmitter, the reception controller 270 proceeds to step 602. When the second charging power adjustment signal is not received from the wireless power transmitter, the reception controller 270 returns to step 600, and continuously performs wireless charging.

In step 602, the reception controller 270 controls the charging control circuit unit 230 to increase maximum charging power of the wireless power receiver to the second threshold power.

In step 603, the reception controller 270 generates a response signal to the second charging power adjustment signal, and transmits the generated response signal to the wireless power transmitter.

In step 604, the reception controller 270 determines whether readjusted wireless power is received. When the readjusted wireless power is received, the reception controller 270 proceeds to step 605. When the readjusted wireless power is not received, the reception controller 270 continuously determines in step 604 whether the readjusted wireless power is received.

In step 605, the charging control circuit unit 230 performs wireless charging such that it charges the readjusted wireless power to the battery unit 240.

As described above, when the sum of powers that the one or more wireless power receivers intend to receive exceeds maximum supplied power that the wireless power transmitter may supply, the present invention enables the adjustment of the power that the one or more wireless power receivers intend to receive, so that each wireless power receiver is wirelessly charged without interruption.

While the present invention has been shown and described with reference to certain embodiments thereof, it will be understood by those skilled in the art that various changes in form and details may be made therein without departing from the spirit and scope of the present invention. Therefore, the spirit and scope of the present invention is not limited to the described embodiments thereof, but is defined by the appended claims and equivalents thereof.

What is claimed is:

1. A transmission apparatus for adjusting charging power of a wireless power receiver, the transmission apparatus comprising:
    a power supply unit which outputs power; and
    a transmission controller which receives a signal for requesting wireless power from at least one wireless power receiver, calculates a sum of required amount of the wireless power of the at least one wireless power receiver, when the calculated sum exceeds maximum amount of supplied wireless power capable of being supplied by the transmission apparatus, transmits a request for adjusting required amount of the wireless power to the at least one wireless power receiver, and when a signal for requesting wireless power corresponding to adjusted amount from the at least one wireless power receiver is received, transmits the wireless power corresponding to the adjusted amount to the at least one wireless power receiver.

2. The transmission apparatus of claim 1, wherein the signal for requesting the wireless power includes identification information and characteristic information of each of the at least one wireless power receiver.

3. The transmission apparatus of claim 2, wherein the characteristic information includes information on total power of the at least one wireless power receiver.

4. The transmission apparatus of claim 3, wherein the transmission controller calculates a sum of maximum amount of wireless power in a constant current mode for the at least one wireless power receiver by using the characteristic information, and determines whether the calculated sum of the maximum amount of the wireless power exceeds the maximum amount of the supplied wireless power capable of being supplied by the transmission apparatus.

5. The transmission apparatus of claim 4, wherein, when the calculated sum of the maximum amount of the wireless power exceeds the maximum amount of the supplied wireless power capable of being supplied by the transmission apparatus, the transmission controller transmits a signal for reducing the maximum amount of the wireless power to the each of the at least one wireless power receiver.

6. The transmission apparatus of claim 4, wherein, when the calculated sum of the maximum amount of the wireless power does not exceed the maximum amount of the supplied wireless power capable of being supplied by the transmission apparatus, the transmission controller transmits the required wireless power, that each of the at least one wireless power receiver has required, to each of the at least one wireless power receiver.

7. The transmission apparatus of claim 5, wherein, when charging of the at least one wireless power receiver is completed, the transmission controller transmits a signal for increasing maximum amount of the wireless power to each of at least one remaining wireless power receiver except for the at least one wireless power receiver for which charging is completed.

8. The transmission apparatus of claim 1, wherein, when a response to the request is received from each of the at least one wireless power receiver, the power supply unit transmits the adjusted amount of the wireless power to each of the at least one wireless power receiver.

9. A reception apparatus for adjusting charging power, the reception apparatus comprising:
    a battery unit which stores power;
    a charging control unit which receives the power, and delivers the received power to the battery unit; and
    a reception controller which transmits a signal for receiving wireless power to a wireless power transmitter, when a request for adjusting required amount of the wireless power is received from the wireless power transmitter, adjusts the required amount of the wireless power, requests wireless power corresponding to the adjusted amount to the wireless power transmitter, and receives the requested wireless power from the wireless power transmitter.

10. The reception apparatus of claim 9, wherein the signal includes identification information and characteristic information of each of the at least one wireless power receiver.

11. The reception apparatus of claim 9, wherein the characteristic information includes information on total power of the at least one reception apparatus.

12. The reception apparatus of claim 9, wherein the reception controller receives a signal for reducing maximum amount of the wireless power of the reception apparatus from the wireless power transmitter.

13. The reception apparatus of claim 12, wherein the reception controller controls the charging control unit to reduce the maximum amount of the wireless power of the reception apparatus to first threshold power, and transmits a response to the wireless power transmitter.

14. The reception apparatus of claim 9, wherein the reception controller receives a signal for increasing the maximum amount of the wireless power of the reception apparatus from the wireless power transmitter.

15. The reception apparatus of claim 14, wherein the reception controller controls the charging control unit to increase the maximum amount of the wireless power of the reception apparatus to the second threshold power, and transmits a response to the wireless power transmitter.

16. A method for adjusting charging power of a wireless power receiver in a wireless power transmitter, the method comprising:
    receiving, by the wireless power transmitter, a signal for requesting wireless power from at least one wireless power receiver;
    calculating, by the wireless power transmitter, a sum of required amount of the wireless power of the at least one wireless power receiver;
    determining, by the wireless power transmitter, whether the calculated sum of the required amount of the wireless power exceeds maximum amount of supplied wireless power capable of being supplied by the wireless power transmitter;

transmitting, by the wireless power transmitter, a request for adjusting the required amount of the wireless power to the at least one wireless power receiver when the calculated sum of the required power amount of the wireless power exceeds the maximum amount of the supplied wireless power; and transmitting, by the wireless power transmitter, wireless power corresponding to adjusted amount to the at least one wireless power receiver when a signal for requesting the wireless power corresponding to the adjusted amount from the at least one wireless power receiver is received.

17. The method of claim 16, further comprising:
transmitting the adjusted amount of the wireless power to each of the at least one wireless power receiver when the response to the request is received from each of the at least one wireless power receiver.

18. The method of claim 16, wherein the signal includes identification information and characteristic information of each of the at least one wireless power receiver.

19. The method of claim 18, wherein the characteristic information includes information on a total power of the at least one wireless power receiver.

20. The method of claim 16, wherein determining whether the calculated sum of the required amount of the wireless power exceeds the maximum amount of the supplied wireless power capable of being supplied by the wireless power transmitter comprises:
calculating a sum of maximum amount of the wireless power in a constant current mode for the at least one wireless power receiver by using the characteristic information; and
determining whether the calculated sum of the maximum amount of the wireless power exceeds the maximum amount of the supplied wireless power capable of being supplied by the wireless power transmitter.

21. The method of claim 20, wherein determining whether the calculated sum of the maximum amount of the wireless power exceeds the maximum amount of the supplied wireless power capable of being supplied by the wireless power transmitter comprises:
generating a signal for reducing the maximum amount of the wireless power of each of the at least one wireless power receiver when the calculated sum of the maximum amount of the wireless power exceeds the maximum amount of the supplied wireless power capable of being supplied by the wireless power transmitter; and
transmitting the generated signal to each of the at least one wireless power receiver.

22. The method of claim 21, wherein determining whether the calculated sum of the maximum amount of the wireless power exceeds the maximum amount of the supplied wireless power capable of being supplied by the wireless power transmitter further comprises:

transmitting the required amount of the wireless power that each of the at least one wireless power receiver has required, to each of the at least one wireless power receiver when the calculated sum of the maximum amount of the wireless power does not exceed the maximum amount of the supplied wireless power capable of being supplied by the wireless power transmitter.

23. The method of claim 22, further comprising:
transmitting a signal for increasing the maximum amount of the wireless power to each of at least one remaining wireless power receiver except for at least one wireless power receiver for which charging is completed, when the charging of the at least one wireless power receiver is completed.

24. A method for adjusting charging power in a wireless power receiver, the method comprising:
transmitting by the wireless power receiver, a signal for receiving wireless power to a wireless power transmitter;
adjusting, by the wireless power receiver, required amount of the wireless power of the wireless power receiver when a request for adjusting required amount of the wireless power is received from the wireless power transmitter;
requesting, by the wireless power receiver, wireless power corresponding to the adjusted amount to the wireless power transmitter; and
receiving, by the wireless power receiver, the requested wireless power from the wireless power transmitter.

25. The method of claim 24, further comprising:
after adjusting the required amount of the wireless power of the wireless power receiver, transmitting a response to the request to the wireless power transmitter.

26. The method of claim 24, wherein the characteristic information includes information on total power of the at least one wireless power receiver.

27. The method of claim 24, wherein receiving the request comprises receiving a signal for reducing maximum amount of the wireless power of the wireless power receiver, from the wireless power transmitter.

28. The method of claim 26, wherein adjusting the required amount of the wireless power of the wireless power receiver comprises:
reducing the maximum amount of the wireless power of the wireless power receiver to a first threshold power; and
transmitting the response to the wireless power transmitter.

29. The method of claim 24, wherein receiving the request comprises receiving a signal for increasing maximum amount of the wireless power of the wireless power receiver, from the wireless power transmitter.

30. The method of claim 29, wherein adjusting the required amount of the wireless power of the wireless power receiver comprises:
increasing the maximum amount of the wireless power of the wireless power receiver to a second threshold power; and
transmitting the response to the wireless power transmitter.

\* \* \* \* \*